United States Patent
Liu et al.

(10) Patent No.: US 7,440,171 B2
(45) Date of Patent: Oct. 21, 2008

(54) STAGED AMPLIFIER FOR LOWER NOISE FIGURE AND HIGHER SATURATION POWER

(75) Inventors: Jian Liu, Sunnyvale, CA (US); Zheng Wang, San Jose, CA (US); Yonglin Huang, Milpitas, CA (US); Xuejun Lu, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 225 days.

(21) Appl. No.: 10/384,227

(22) Filed: Mar. 7, 2003

(65) Prior Publication Data

US 2004/0085622 A1 May 6, 2004

Related U.S. Application Data

(60) Provisional application No. 60/422,575, filed on Oct. 31, 2002.

(51) Int. Cl.
*H01S 4/00* (2006.01)
*H04B 10/12* (2006.01)

(52) U.S. Cl. .................. 359/337.3; 359/337.4

(58) Field of Classification Search .............. 359/337.3, 359/337.4
See application file for complete search history.

(56) References Cited

U.S. PATENT DOCUMENTS

| | | | | |
|---|---|---|---|---|
| 5,027,079 A | * | 6/1991 | Desurvire et al. | 359/341.32 |
| 5,278,686 A | * | 1/1994 | Grasso et al. | 398/15 |
| 5,532,870 A | * | 7/1996 | Shigematsu et al. | 359/337.4 |
| 5,640,269 A | * | 6/1997 | Shigematsu et al. | 359/337.4 |
| 5,731,892 A | * | 3/1998 | DiGiovanni et al. | 359/337.4 |
| 5,742,427 A | * | 4/1998 | Kakui et al. | 359/337.4 |
| 5,880,877 A | * | 3/1999 | Fermann et al. | 359/341.31 |
| 6,266,180 B1 | * | 7/2001 | Inagaki et al. | 359/337 |
| 6,429,964 B1 | * | 8/2002 | Delavaux et al. | 359/337.3 |
| 6,462,862 B2 | * | 10/2002 | Kinoshita | 359/334 |
| 6,850,677 B2 | * | 2/2005 | Dennis et al. | 385/123 |
| 2003/0031440 A1 | * | 2/2003 | Dennis et al. | 385/123 |

OTHER PUBLICATIONS

Becker, P. C., et al. "Erbium-Doped Fiber Amplifiers Fundamentals and Technology", Academic Press, San Diego, 1999, pp. 169, 178-179.*

"Erbium-Doped Fiber:High Performance Fibers for Superior Amplifiier Design", Furukawa Electric North America, Inc. (2004).*

Becker et al., Erbium-Doped Fiber Amplifiers: Fundmentals and Technology, Academic Press, San Diego, (1999), pp. 44-47.*

* cited by examiner

*Primary Examiner*—Eric Bolda
(74) *Attorney, Agent, or Firm*—Workman Nydegger (57) ABSTRACT

An optical amplifier utilizes two or more doped fiber segments or portions to achieve a lower noise figure and a higher saturation power than would be possible using any one of the doped fiber segments. Each doped fiber portion may be considered to be a doped fiber optical amplifier, and has a different doping level than each of the other doped fiber portions. Each such doped fiber portion has distinct amplitude gain and noise characteristics relative to each of the other doped fiber potions. The two or more doped fiber portions are coupled to each other in series and most often in a predefined order based on their relative amplitude gain, noise and saturation power characteristics.

20 Claims, 6 Drawing Sheets

Figure 4 Gain and NF as a function of fiber length

Figure 5 Gain and NF as a function of pump power for a 6 m of high doping EDF

Figure 6 Simulation results for EDF R37013 at a length of 6 m under 80 mW 980 nm pump Figure 7 saturation power as a function of doping concentration Figure 8 NF as a function of doping concentration

200
STAGED AMPLIFIER FOR LOWER NOISE FIGURE AND HIGHER SATURATION POWER

This application claims priority to U.S. provisional application No. 60/422,575, filed Oct. 31, 2002, entitled "Staged Amplifier for Lower Noise Figure and Higher Saturation Power", which is hereby incorporated by reference.

FIELD OF THE INVENTION

The present invention relates generally to optical amplifiers, and particularly to a system of two or more staged doped fiber amplifiers having a lower noise figure and a higher saturation power than available in single doped fiber amplifiers.

BACKGROUND OF THE INVENTION

Optical amplifiers are often used in optical communications to amplify a transmission signal. A signal being transmitted through a fiber optic system may suffer amplitude attenuation due to energy absorption, beam scattering and other processes during transmission. To compensate for such signal loss, optical amplification may be used to increase the amplitude of the signal leaving a transmitter or to increase the amplitude of a signal coming in to a receiver. Passive optical amplifiers are often used for such amplification.

Doped fiber amplifiers are one type of passive optical amplifier. Doped fiber amplifiers typically include a length of optical fiber that has been doped with one or more elements, such as rare earth elements (e.g., erbium). Such amplifiers amplify a transmission signal when the doped fiber receives optical energy from a pump source. Such amplification is produced by stimulated emission—the dopants in the doped fiber are stimulated to a higher energy state by receiving pump power in order to achieve a population inversion. As energy falls back to lower energy levels additional photons at the transmission signal wavelength and coherent therewith may be emitted. Usually the doped fiber responds most efficiently to one or more pumping wavelengths. A pump source is often chosen based on the wavelengths that are the most efficient pumping wavelengths for the doped fiber amplifier. Additionally, the amplification imparted to the transmission signal may have a gain curve with one or more peaks corresponding to specific transmission signal wavelengths. The doped fiber most efficiently and effectively amplifies signals with wavelengths near those peak wavelengths. The characteristics that define the output of a given doped fiber may include: gain per unit length, saturation power, noise figure, gain curve profile, and pump energy absorption.

Both long distance and metro area telecommunications systems include optical fiber, transceivers and passive optical amplifiers. However, metropolitan area networks (MANs) tend to have shorter distances between transceivers, are more cost sensitive than long distance telecommunications systems, and may be more tolerant to noise or bit error rates (BER). Embodiments of the present invention may be applicable to either type of system.

SUMMARY OF THE INVENTION

In summary, the present invention is an optical amplifier utilizing two or more doped fiber portions to achieve a lower noise figure and a higher saturation power than in a single doped fiber amplifier. Doped fiber portions used in embodiments of the present invention may have different doping levels relative to each of the other doped fiber optical amplifiers, and each such doped fiber optical amplifier may have distinct amplitude gain and noise characteristics relative to each of the other doped fiber optical amplifiers. The two or more doped fiber amplifiers are coupled to each other in-line or in sequence, and in a specific order based on their relative amplitude gain, noise and saturation power characteristics.

The present invention may be implemented as an optical amplifier having a first doped fiber optical amplifier, wherein an optical signal transmitted through the first doped fiber amplifier is amplified with a first gain per unit length; a second doped fiber optical amplifier coupled to the first doped fiber optical amplifier, wherein an optical signal passing from the first doped fiber amplifier to the second doped fiber optical amplifier and transmitted through the second doped fiber optical amplifier is amplified with a second gain per unit length higher than the first gain per unit length of the first doped fiber optical amplifier; and a third doped fiber optical amplifier coupled to the second doped fiber optical amplifier to receive the optical signal from the second doped fiber optical amplifier, wherein the third doped fiber optical amplifier has a higher saturation power than either of the first doped fiber optical amplifier and the second doped fiber optical amplifier, the third doped fiber optical amplifier having a third gain per unit length.

BRIEF DESCRIPTION OF THE DRAWINGS

Additional objects and features of the invention will be more readily apparent from the following detailed description and appended claims when taken in conjunction with the drawings.

DESCRIPTION OF THE PREFERRED EMBODIMENTS

Figure 1A:
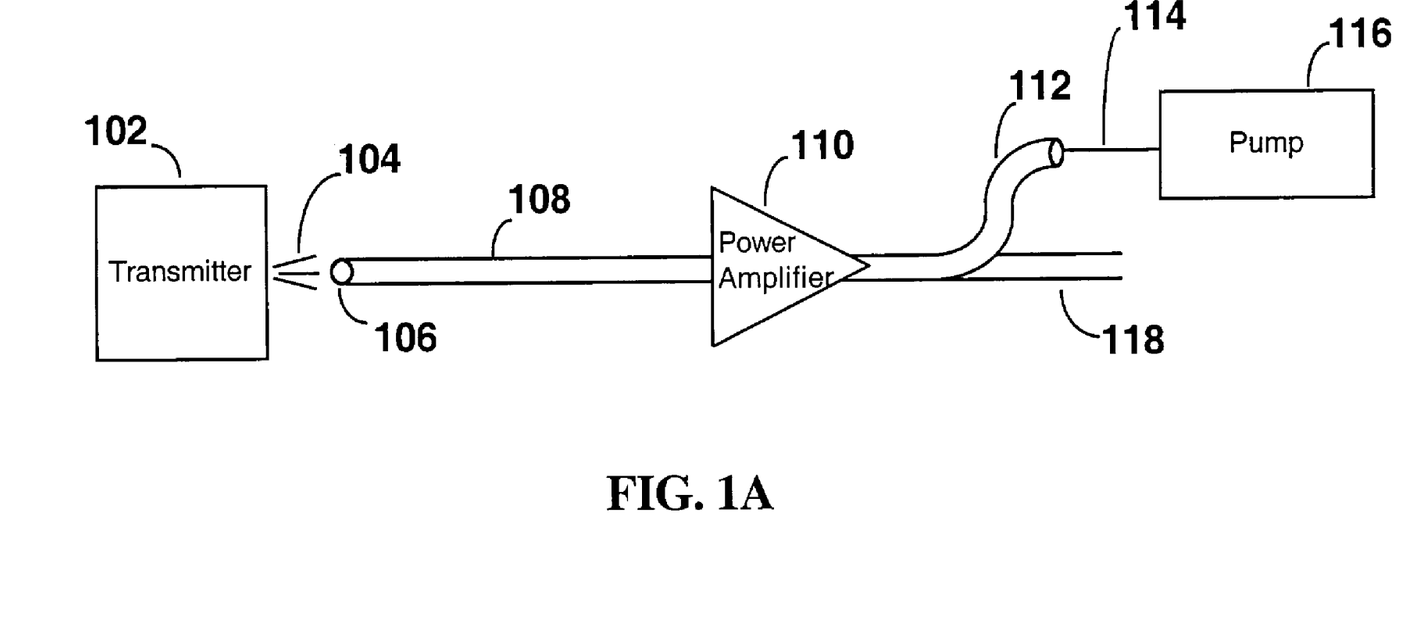
FIGS. 1A and 1B are block diagrams of an optical amplifier.
Figure 1B:
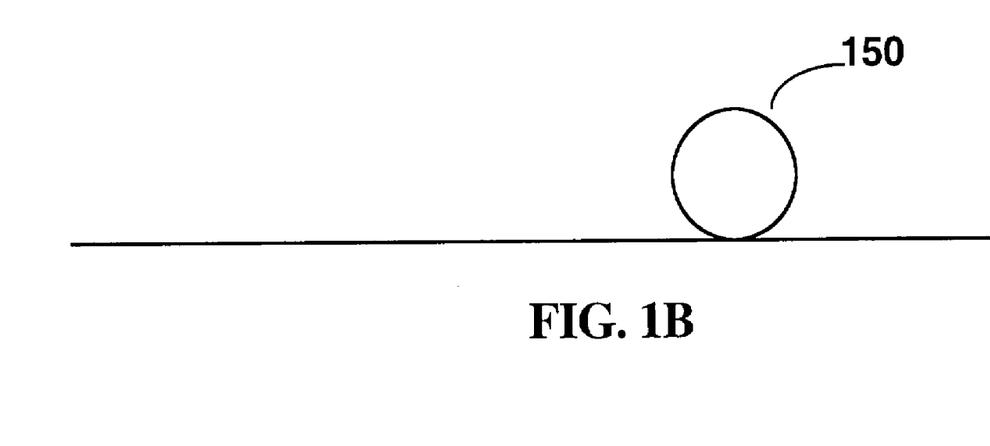

Referring to FIGS. 1A and 1B, there is shown an example of a conventional approach to optical power amplifiers. Such doped fiber amplifiers usually include a length of optical fiber that has been doped with certain elements. Such amplifiers amplify a transmission signal when the doped fiber receives optical energy from a pump source. These conventional amplifiers produce amplification by stimulated emission—the dopants in the doped fiber are stimulated to a higher energy state by receiving pump power such that they achieve a population inversion. As energy falls back to lower energy levels, additional photons at the transmission signal wavelength(s) and coherent therewith may be emitted. In other words, a doped fiber optical amplifier may be described as a laser without feedback. Such amplification is often necessary in optical communication systems in order to overcome signal losses due to various system limitations, such as fiber loss and dispersion, among others. The gain of doped fiber amplifiers is generally directly proportional to the dopant concentration in the fiber. In other words, the relationship of gain to dopant concentration is usually linear.

In this example, FIG. 1A shows a transmitter 102 transmitting an optical signal 104 into an optical fiber 108. The optical fiber 108 is coupled to a power amplifier 110 to amplify the transmission signal before it is transmitted to an output fiber 118. The power amplifier receives optical pump energy (i.e., light) from the pump source 116. The amplifier includes a doped fiber portion that amplifies one or more transmission wavelengths when the doped fiber is pumped by a pump source of light at one or more wavelengths. FIG. 1B shows a simplified depiction of the portion of doped fiber 150 within an optical fiber amplifier. The doped fiber portion 150 may be looped within a larger structure in order to have the length to achieve a desired amplification. The pump source emits a beam of light 114 into an optical fiber 112 which is coupled into the power amplifier 110. The pump energy may be coupled into the fiber in the same or the opposite direction (the opposite direction, or backward pumping, is shown in FIG. 1A) to that of the transmission signal, or pump energy (i.e., light from an optical pump) may be coupled into the doped fiber optical amplifier in both directions. The result of such doped fiber optical amplifiers is to amplify the transmission signal being transmitted through the amplifier. Such transmission signals may have a single wavelength or multiple wavelengths (e.g., in a wave-division multiplexing (WDM) configuration).

Several problems or limitations are inherent in a given such conventional doped fiber amplifier. First, the doped fiber amplifier may add noise to the transmission signal due to thermal, dispersion, stimulated or spontaneous emission, or other noise generating mechanisms. Second, gain may be limited by various factors, such as doped fiber length, saturation power and dopant concentration. Third, pump power may be reduced in traveling through the length of the doped fiber amplifier, as pump energy is absorbed by the fiber. The pump energy is absorbed in part by the dopant in raising the doped fiber to a higher energy level for use in stimulated emission amplification. These various limitations are inter-related in part by the following parameters: dopant type; dopant concentration; length of doped portion; core radius; pump wavelength; pump power amplitude; signal wavelength or wavelengths; and signal power amplitude.

There is often a trade-off between gain and noise. A single doped fiber amplifier has a certain gain per unit length. For example, the gain is generally directly proportional to the dopant concentration in the fiber. In other words, the relationship of gain to dopant concentration is linear. Generally, gain may be increased by increasing one or more of the following parameters: the dopant concentration, the length of the doped fiber, or the core radius of the doped fiber. However, noise will generally increase substantially in proportion with those same parameter changes. Additionally, increased length and/or dopant concentration typically causes increased pump power attenuation over the length of the doped fiber as the dopant absorbs more pump power. As the pump power is absorbed over the length of the doped fiber, less pump power reaches the distant portions of the doped fiber, which may result in a loss of stimulated emission and a loss of amplification therein. In these portions of the doped fiber, the power of the transmitted signal may be reduced by absorption. Additionally, as the power of the transmitted signal increases down the length of the doped fiber (due to the amplification of the signal), the saturation power of the doped fiber may be reached. Saturation causes a decrease or cessation of amplification past that saturation power.

Embodiments of the present invention use multiple doped fiber portions in sequence. An embodiment of the present invention uses two or more doped fiber sections with similar core cross-sections spliced together. The individual doped fiber portions to be spliced together are chosen based on various characteristics that cause a transmission signal transmitted through the staged doped fiber amplifier to have higher gain and lower noise than would be possible using a single doped fiber.

Figure 2:
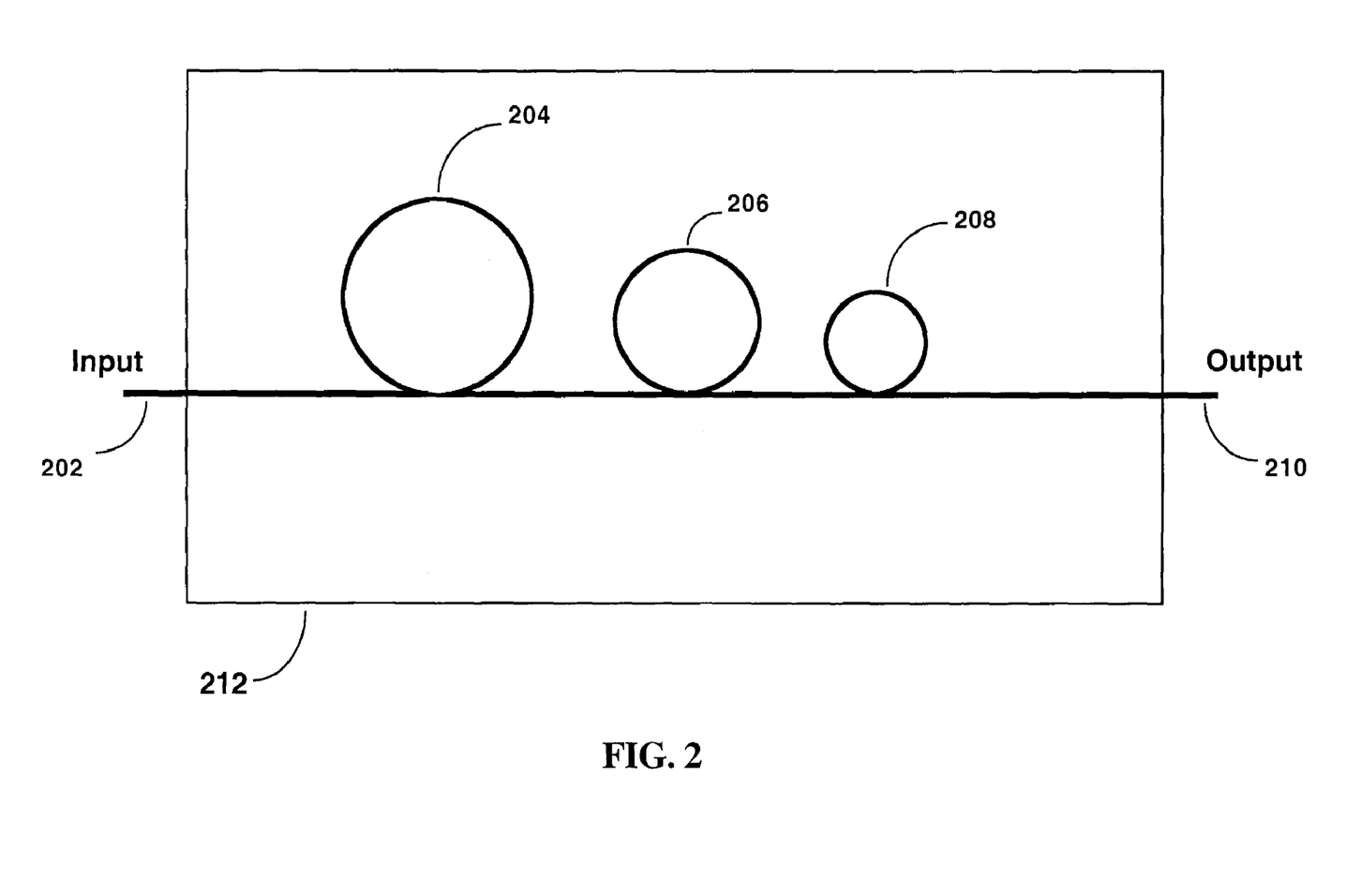
FIG. 2 is a conceptual diagram of a staged doped fiber amplifier.

As shown in FIG. 2 in schematic form, an embodiment of the present invention may include three doped fiber optical amplifiers (204, 206, 208), also herein called doped fiber portions or doped fiber segments, spliced together in a row. These are shown as loops, because doped fibers are often looped to maintain sufficient fiber length while minimizing space used. When a transmission signal enters such an optical amplifier through the input 202, it is amplified in sequence through the three doped fiber portions. The gain from each doped fiber portion is added (if gain is measured in logarithmic units). The resultant amplified transmission signal exits the optical amplifier through the output 210. As described in greater detail below, the individual doped fiber portions may be of different lengths and dopant concentrations. In FIG. 2, the differing sizes of the circles (204, 206, 208) depicting the doped fiber portions shows one embodiment in which the lengths of the doped fiber portions 204, 206, 208 decrease in the direction of signal transmission, while dopant levels increase in the same direction. Not shown, but inherent in the depiction of FIG. 2, is one or more pump energy sources to pump the doped fiber portions to induce stimulated emission amplification.

Gain may be defined as:
ain=$10*\log_{10}(P_{out}/P_{in})$, wherein $P_{out}$ is the amount of signal power leaving the amplifier, and $P_{in}$ is the amount of signal power entering the amplifier.

Figure 3A:
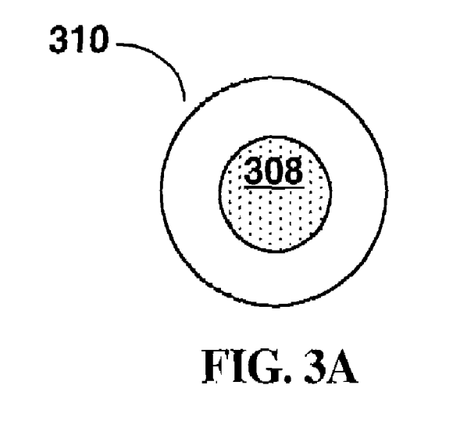
FIG. 3A is an axial view of a fiber optic cable.
Figure 3B:
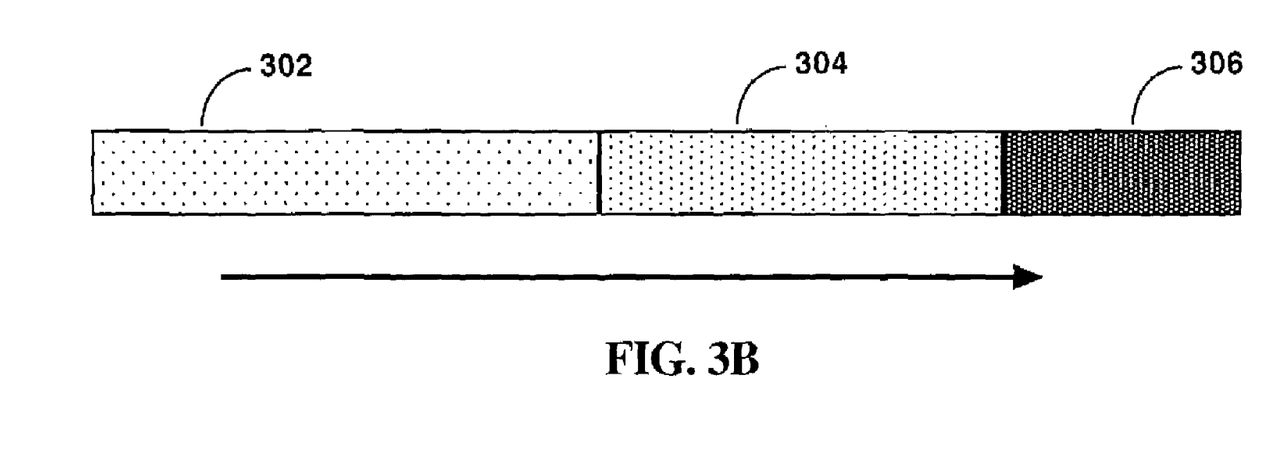
FIG. 3B is a block diagram of an embodiment of a staged doped fiber amplifier.

FIGS. 3A and 3B further show an embodiment of the present invention. FIG. 3A shows an end view of a optic fiber with a central core 308 and a surrounding cladding 310. The dopant is incorporated into the core section 308. In the preferred embodiments of the present invention, the core cross-section is substantially the same between the two or more doped fiber portions spliced together to minimize losses caused thereby—i.e., splicing losses. This means the splicing loss between the doped fiber portions can be kept small.

FIG. 3B shows an embodiment in which three different doped fiber portions (302, 304, 306) are spliced together in line sequence. The arrow below these portions shows the direction of signal transmission. In this embodiment, the lengths of the three doped fiber portions are different, as are the dopant concentrations within each. The lengths decrease in the transmission signal direction, while the dopant levels increase in that direction.

The preferred embodiments of the present invention include two or more doped fiber portions in sequence. In one embodiment employing three doped fiber portions, a low noise low gain amplifier is used as a first doped fiber portion, followed by a second doped fiber portion having higher gain than the first doped fiber portion, and then a third doped fiber portion which is heavily doped to have an even higher gain than the second doped fiber portion and a higher saturation power than the first and second doped fiber portions. The gain properties of the successive doped fiber portions are differentiated by using different doping profiles and lengths, while maintaining the same core size. Alternate embodiments may include two doped fiber portions, in which case the second and third doped fiber portions described may be used, for example, without the first doped fiber portion. Further alternate embodiments may include more than two or three doped fiber portions of varying design.

An embodiment having three doped fiber portions includes the following elements:

a first doped fiber portion having a low gain, low noise EDF (erbium doped fiber) at this first stage for a lower noise factor (NF);

1. a second doped fiber portion optimized for gain (provding more gain than the first doped fiber portion); and
2. a third doped fiber portion highly doped for high saturation power ($P_{sat}$).

Low doping is used in the first stage, with progressively higher dopant concentrations in the second and third stages of the amplifier. The lengths of the doped fibers get progressively shorter from the first stage to the third. The third stage is preferably highly doped to increase its saturation power, but is also relatively short to limit the amount of noise added to the transmission signal passing through the heavily doped fiber.

Additionally, a backward pumping scheme may be used for increased pump efficiency under this configuration. However, forward, bi-directional pumping or other pumping schemes may also be utilized.

To achieve increased gain, limited noise and a higher saturation power through an embodiment of the present invention, multiple variables must be managed and chosen to achieve the desired results. Variables here include both fiber characteristics and system characteristics affecting the operation of the various doped fiber portions. These variables include: dopant type (for example, various rare earth elements, such as erbium); dopant concentration; doped fiber length; doped fiber core dimensions; optical pump power supplied to a doped fiber portion; pump source wavelength or wavelengths; transmission signal power into a doped fiber portion; and transmission signal wavelength or wavelengths. Each different doped fiber portion included in an embodiment of the present invention has distinct values with respect to two or more of these variables. Variables such as pump power and transmission signal power automatically and inevitably change across the staged amplifier upon passage of the transmission signal and pump signal through consecutive different doped fiber portions, due to amplification of the transmission signal and absorption of the pump power. As a result, each doped fiber portion of the staged amplifier receives a different pump or transmission signal power from that which entered the previous doped fiber portion.

While all of the above-mentioned variables may be altered or controlled in a given fiber portion, some of these variables are preferably the same across the entire set of fiber portions of a staged amplifier in accordance with the present invention. These variables may include dopant type, core size, pump wavelength and signal wavelength. For example, often one dopant type may be chosen as it impacts the optimum pump wavelength and signal wavelength(s) used therewith. For telecommunications applications, erbium is preferably used as the dopant in all doped fiber portions of the staged amplifier, in part because erbium doped fibers have gain characteristics that provide maximum and relatively uniform amplification for optical signals having wavelengths in the 1530 to 1560 nanometer range, and they respond best to pump wavelengths in the 980 nanometer range.

In some embodiments, successive doped fiber portions of the staged amplifier may be doped with different dopants. However, in most embodiments using different dopants in different portions of the staged amplifier is unlikely to be beneficial because the wavelength of the transmission signal will generally be the same for all portions of the staged amplifier, and the wavelength of the pump energy will also typically be the same for all portions of the staged amplifier. Nevertheless, different dopants provide different signal amplification characteristics and there may be embodiments in which using different dopants in different portions or stages would be beneficial. For example, such embodiments may employ pumping sources having multiple wavelengths.

Core radius may impact the operation of doped fiber amplifiers, as the dimensions of the core (along with the length of the doped fiber portion) define the volume of the doped fiber portion through which pump energy and transmission signal energy pass. Embodiments of the present invention include substantially similar, if not identical, core dimensions for each of the two or more staged doped fiber portions. Using successive doped fiber portions with the same or substantially similar core dimensions serves to minimize losses associated with splicing.

In some embodiments, then, the primary control variables (i.e., once dopant type and core dimensions are chosen, and within the context thereof) for each doped fiber portion may be: dopant concentration; doped fiber length; pump power (optical amplitude); and transmission signal power (optical amplitude). By designing a staged doped fiber amplifier using portions having selected values for each of these primary control variables—a resultant set of overall staged doped fiber amplifier characteristics may be achieved. This may include starting with a first doped fiber portion and determining various values for the primary control variables. By proper selection of these primary control variables, a target set of output characteristics will be achieved. These output characteristics may include transmission signal gain, noise figure, saturation power, and/or attenuation of pump energy. In other words, a predicted or measured value may be determined for the first fiber portion having a chosen dopant level, length and input pump and transmission signal amplitude. The characteristics of the resulting amplified optical signal may then be provided to a second doped fiber portion having a different set of chosen primary control variable values. By continuing this process through two or more doped fiber portions, overall values for gain, noise, saturation power and/or pump power throughput may be obtained.

In an embodiment of the present invention, pump power may be provided to the two or more doped fiber portions in a direction opposite to the transmission signal direction. This may be termed a backward pumping scheme. In such a system, a bi-directional design may be employed similar to the uni-directional method of the previous paragraph, but with the added factor of the pump power amplitude and effects traveling opposite to that of the input transmission signal. For example, first and second doped fiber portions may be chosen with a set of primary control variable values. A measurement or calculation of the pump power throughput for the second doped fiber portion may be obtained and then used in the determination of gain, noise and saturation power for the first doped portion. The gain and noise values so determined from the first doped fiber portion may then be provided to a determination of gain, noise and saturation power for the second doped fiber portion having the original pump power provided to it. This method of design and measurement may be used with more than two doped fiber portions as well.

Such design may be done in part using computer simulation. A multiple variable analysis may then be accomplished or a database created with various values provided for various sets of variable configurations.

Figure 4:
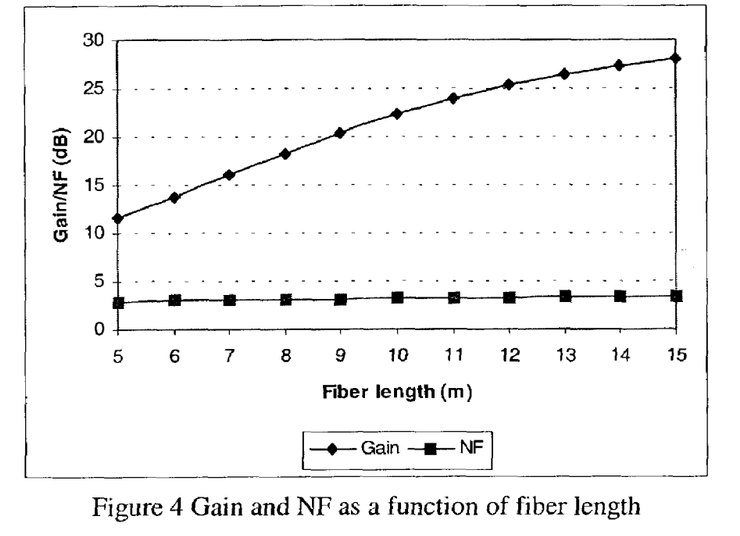
FIG. 4 is a graph of Gain and Noise Figure (in decibels (dB)) vs. fiber length (in meters(m)) in an exemplary doped fiber amplifier.

The effects of the primary control variables for a given dopant type fiber may be seen in exemplary graphs. For example, FIG. 4 shows a simulation result for a first stage erbium doped fiber portion. This graph shows the impact of doped fiber length on gain and noise figure for a given input transmission signal and pump power amplitude. This exemplary first erbium doped fiber receives pump energy at an amplitude of 20 mW at 980 nm. This exemplary first stage doped fiber may have a large pump/gain conversion efficiency, such as Lucent HE 980 EDF (Erbium Doped Fiber) fiber, from Lucent Technologies. FIG. 4 shows that with pump energy of 20 mW and 12 meters of EDF, 25 dB gain and 3.5 dB NF may be achieved at a signal wavelength of 1550 nm and input signal power of −30 dBm.

Figure 5:
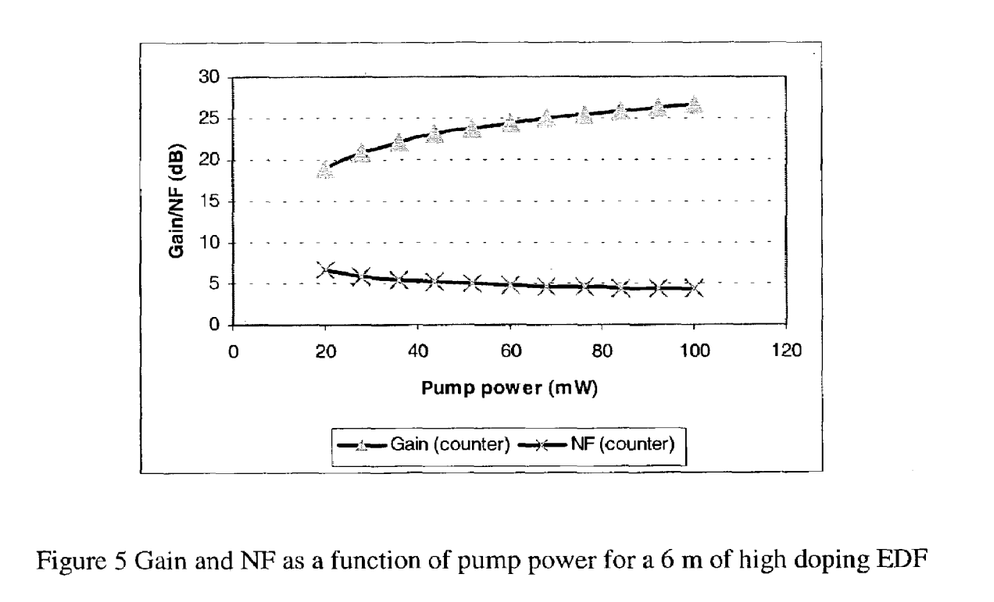
FIG. 5 is a graph of Gain and Noise Figure (in decibels (dB)) vs. pump power (in milliwatts (mW)) in an exemplary doped fiber amplifier.
Figure 6:
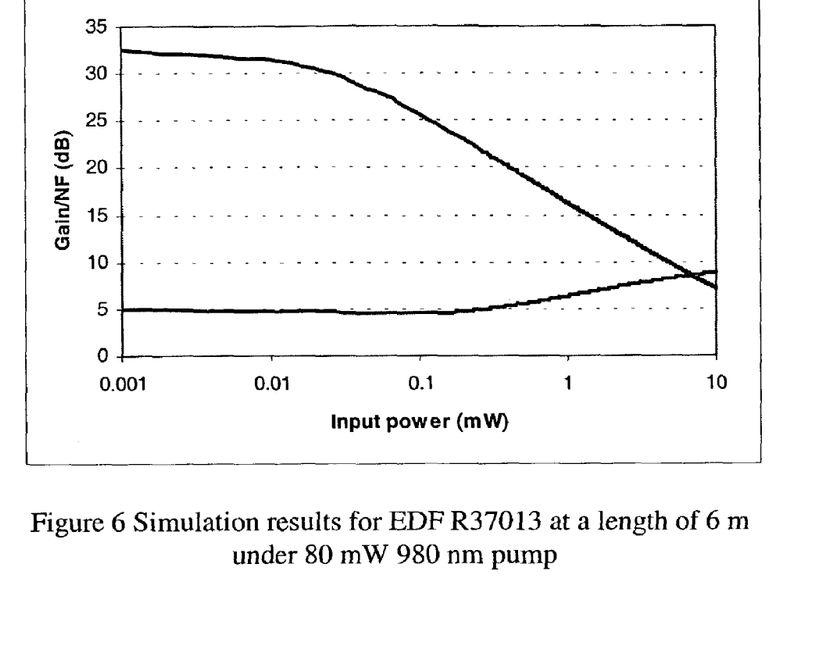
FIG. 6 is a graph of Gain and Noise Figure (in decibels (dB)) vs. transmission signal input power (in milliwatts (mW)).

A graph for an exemplary second or third stage doped fiber portion shows a highly doped erbium-doped fiber, such as Lucent Technologies' R37103, EDF-LSL or EDF-LRL fibers. These may be used especially in the third stage of an exemplary three stage embodiment of the present invention in order to achieve higher output power due to such doped fiber's higher saturation power. FIG. 5 shows simulated gain and noise figure values for varied input pump power amplitudes in a 6 meter portion of Lucent R37103 fiber under a counter-pumping configuration. FIGS. 5 and 6 shows that the noise figure decreases with increasing pump power.

FIG. 6 shows simulated gain and noise figure values for varied input transmission signal amplitudes in a 6 meter portion of Lucent R37103 fiber under a counter-pumping configuration. This may be used in an exemplary second or third stage doped fiber portion. The pump power applied in this example is 80 mW at 980 nanometers.

Figure 7:
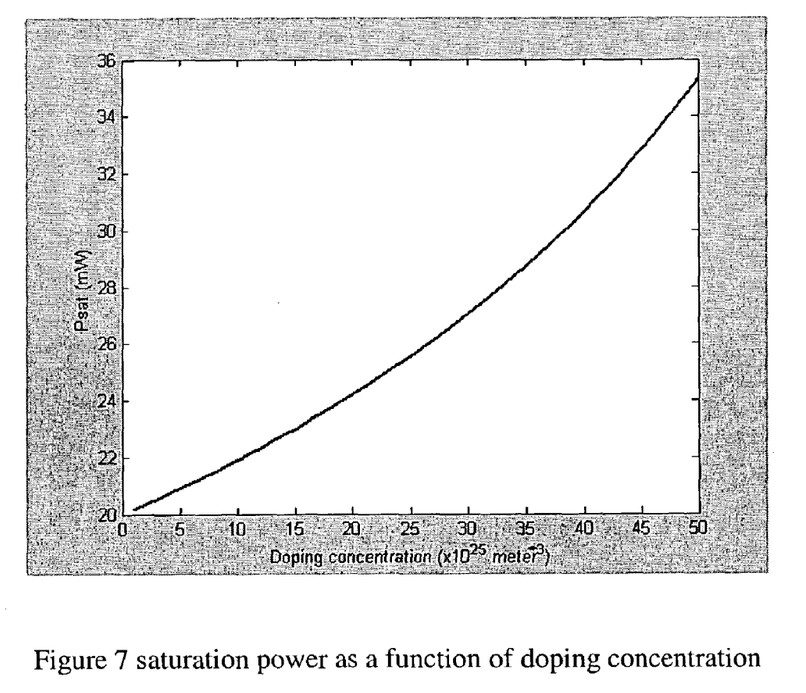
FIG. 7 is a graph of Saturation Power (in milliwatts (mW)) vs. doping concentration ($\times 10^{25}$ m$^{-3}$).
Figure 8:
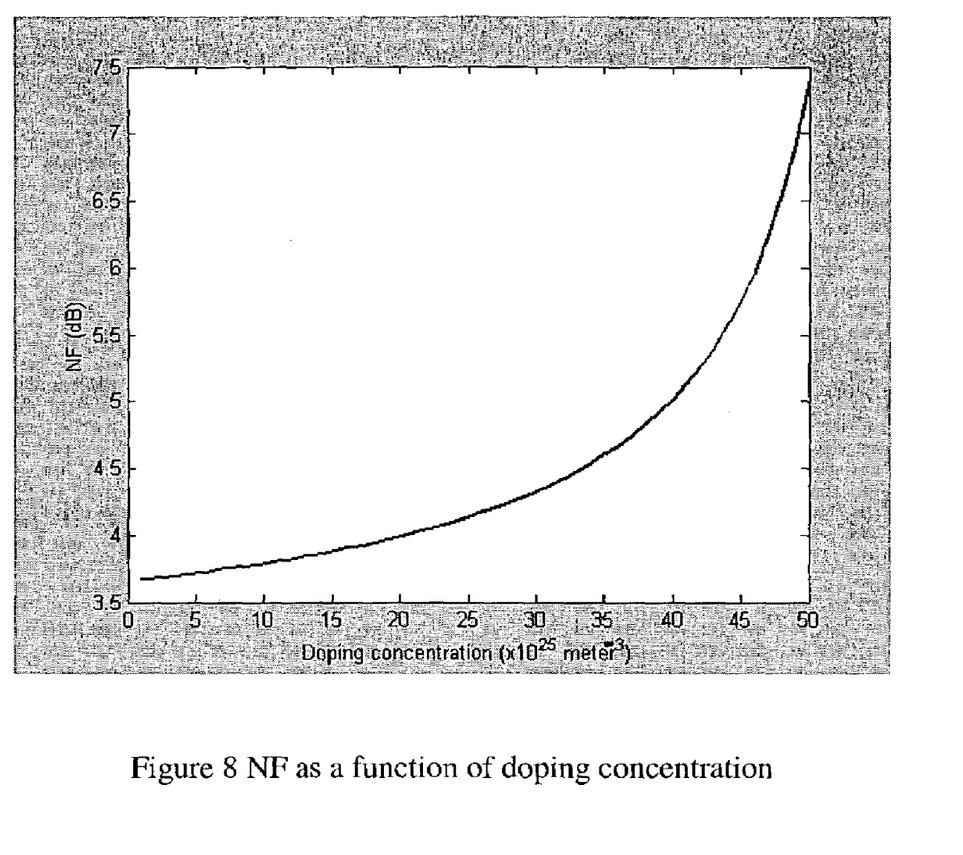
FIG. 8 is a graph of Noise Figure (decibels (dB)) vs. doping concentration ($\times 10^{25}$ m$^{-3}$).

Saturation power and noise figure (NF) as a function of erbium doping concentration are shown in FIGS. 7 and 8. By controlling doping concentrations, it is possible to achieve a higher saturation power with a reasonable NF. By altering dopant concentrations, the saturation power and noise figure for a given doped fiber portion may be altered or controlled to fit a desired overall optical amplifier operation character.

Dopant concentrations for relative low, medium and high dopant concentrations may be considered here for an erbium doped fiber as seen in FIGS. 7 and 8 as:
 Low: $<10*10^{25}$ meters$^{-3}$
 Medium: $>8*10^{25}$ meters$^{-3}$ and $<35*10^{25}$ meters$^{-3}$
 High: $>30*10^{25}$ meters$^{-3}$ Using these three dopant concentration ranges as a guide, in a preferred embodiment the first doped fiber section of the three stage doped fiber amplifier has a low erbium dopant concentration, below $10*10^{25}$ meters$^{-3}$, the second doped fiber section has a medium erbium dopant concentration, between $8*10^{25}$ meters$^{-3}$ and $35*10^{25}$ meters$^{-3}$, and the third doped fiber section has a high erbium dopant concentration, above $30*10^{25}$ meters$^{-3}$. In an alternate embodiment, the definitions of low, medium and high dopant concentrations may be different, and non-overlapping. For instance, in an alternate embodiment, a low dopant concentration is less than or equal to $8*10^{25}$ meters$^{-3}$, a medium dopant concentration is between $10*10^{25}$ meters$^{-3}$ and $30*10^{25}$ meters$^{-3}$, and a high dopant concentration is equal to or greater than $35*10^{25}$ meters$^{-3}$.

Thus, the primary operation characteristics (i.e., gain, noise figure, and saturation power) of individual doped fiber portions may be simulated, calculated and/or measured for exemplary configurations of primary control variables. Such variables and information may be used for two or more doped fiber portions to simulate, calculate and/or design a staged doped fiber optical amplifier according to an embodiment of the present invention. By altering dopant concentrations and doped fiber portion lengths, pump power loss and transmission signal gain through a given doped fiber portion may be determined and the results provided to the next doped fiber portion in line in either direction. The overall staged amplifier operation characteristics may then be determined and designed accordingly. The resultant staged amplifier, depending on the choice of two or more doped fiber portions, demonstrates a higher gain and lower noise figure than for a conventional, single doped fiber amplifier.

EXAMPLE

As an example of a doped fiber amplifier according to the above embodiments, a three-section doped fiber amplifier will be described here. All three sections have the same core radius, and all are erbium doped. The first section has an erbium concentration of $8\times10^{25}$ meters$^{-3}$ (and more generally less than $10\times10^{25}$ meters$^{-3}$), and is 6 meters in length. The second section has an erbium concentration of $25\times10^{25}$ meters$^{-3}$, and is 4 meters in length. The third section has an erbium concentration of $40\times10^{25}$ meters$^{-3}$, and is 2 meters in length. Thus, a length ration of 3:2:1 is used, such that the lengths of the individual amplifier sections are decreasing in length in the direction of the transmission signal. The first section has a gain of about 20 dB, the second section has a gain of about 20 dB and the third section has a gain of about 10 to 15 dB. The light from the optical pump may be transmitted through the doped fiber amplifier in either direction—i.e., in the same direction as the transmission signal, or in a reverse or counter direction. Light from one or more optical pumps may also be applied (i.e., transmitted through the doped fiber amplifier) in both directions at the same time. The ratio of the lengths of individual amplifier sections may be significantly greater than the 3:2:1 ratio of this example. In some embodiments the ratio of the lengths of the first and second amplifier sections may be significantly greater than 3 to 2. In some embodiments the ratio of the lengths of the second and third amplifier sections may be significantly greater than 2 to 1.

The embodiments described above may be applied to various systems for transmitting or amplifying optical energy, including both long-haul and metropolitan area telecommunications systems. Alternate embodiments may include two or more doped fiber portions, including one or more fiber portions having progressive or gradually changing doping level over the length of the fiber portion.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An optical amplifier, comprising:
 a first doped fiber portion, wherein an optical signal transmitted through the first doped fiber portion is amplified with a first gain per unit length and wherein the first doped fiber portion has first control values selected to generate a first set of output characteristics;
 a second doped fiber portion coupled to the first doped fiber portion to receive the optical signal from the first doped fiber portion, wherein the optical signal is amplified by the second doped fiber portion with a second gain per unit length that is higher than the first gain per unit length of the first doped fiber portion, wherein the second doped fiber portion has second control values that are selected to produce a second set of output characteristics based on the second control values and the first set of output characteristics; and a third doped fiber portion coupled to the second doped fiber portion to receive the optical signal from the second doped fiber portion, wherein the third doped fiber portion has a higher saturation power than either of the first doped fiber portion and the second doped fiber portion, the third doped fiber portion having a third gain per unit length, wherein the third doped fiber portion has third control values and produces a third set of output characteristics based on the third control values and the second set of output characteristics; and wherein:
the first, second and third control values each include one or more of a dopant concentration, a doped fiber length, a pump power, or a transmission signal power; and the first, second, and third set of output characteristics each include one or more of a transmission signal gain, a noise figure, a saturation power, or an attenuation of pump energy.

2. An optical amplifier according to claim 1, wherein the fiber core cross-section is substantially the same for the first doped fiber optical amplifier, the second doped fiber optical amplifier and the third doped fiber optical amplifier.

3. An optical amplifier according to claim 1, wherein the first doped fiber optical amplifier is doped with a rare earth element.

4. An optical amplifier according to claim 1, wherein the first doped fiber optical amplifier is doped with erbium.

5. An optical amplifier according to claim 1, wherein the first doped fiber optical amplifier is doped to a concentration of less than $10 \times 10^{25}$ parts per meter$^{-3}$.

6. An optical amplifier according to claim 1, wherein the second doped fiber optical amplifier is doped with a rare earth element.

7. An optical amplifier according to claim 1, wherein the second doped fiber optical amplifier is doped with erbium.

8. An optical amplifier according to claim 1, wherein the second doped fiber optical amplifier is doped to a concentration of between $8 \times 10^{25}$ parts per meter$^{-3}$ and $35 \times 10^{25}$ parts per meter$^{-3}$.

9. An optical amplifier according to claim 1, wherein the third doped fiber optical amplifier is doped with a rare earth element.

10. An optical amplifier according to claim 1, wherein the third doped fiber optical amplifier is doped with erbium.

11. An optical amplifier according to claim 1, wherein the third doped fiber optical amplifier is doped to a concentration greater than $30 \times 10^{25}$ parts per meter$^{-3}$.

12. An optical amplifier according to claim 1, further comprising a pump light source configured to transmit light through the first doped fiber optical amplifier, the second doped fiber optical amplifier and the third doped fiber optical amplifier.

13. An optical amplifier according to claim 12, wherein the pump light source is a laser.

14. An optical amplifier according to claim 13, wherein the laser is configured to transmit light through at least the third doped optical fiber in a direction opposite that of the optical signal.

15. An optical amplifier according to claim 1, wherein the first and second doped fiber optical amplifiers have a length ratio of at least 3 to 2.

16. An optical amplifier according to claim 15, wherein the second and third doped fiber optical amplifiers have a length ratio of at least 2 to 1.

17. An optical amplifier according to claim 1, wherein each of the first, second and third doped fiber optical amplifiers has a gain in a range between about 5 dB and 25 dB.

18. An optical amplifier according to claim 1, wherein the first doped fiber optical amplifier has a gain of about 25 dB.

19. optical amplifier according to claim 1, wherein the second doped fiber optical amplifier has a gain of about 20 dB.

20. An optical amplifier according to claim 1, wherein the third doped fiber optical amplifier has a gain in a range between about 10 dB and about 15 dB.

* * * * *